(12) United States Patent
Demeilliez et al.

(10) Patent No.: US 11,200,097 B2
(45) Date of Patent: Dec. 14, 2021

(54) DEVICE AND METHOD FOR OPTIMIZING THE UTILIZATION OVER TIME OF THE RESOURCES OF AN IT INFRASTRUCTURE

(71) Applicant: BULL SAS, Les Clayes-sous-Bois (FR)

(72) Inventors: Bruno Demeilliez, Saint Laurent du Pont (FR); Christophe Germain, Grenoble (FR); José Ignacio Alvarez Marcos, Saint Jean d'Ardières (FR)

(73) Assignee: BULL SAS, Les Clayes-sous-Bois (FR)

( * ) Notice: Subject to any disclaimer, the term of this patent is extended or adjusted under 35 U.S.C. 154(b) by 196 days.

(21) Appl. No.: 16/426,519

(22) Filed: May 30, 2019

(65) Prior Publication Data
US 2019/0370083 A1 Dec. 5, 2019

(30) Foreign Application Priority Data
May 31, 2018 (FR) ...................................... 1854716

(51) Int. Cl.
*G06F 9/50* (2006.01)
*G06F 11/30* (2006.01)
*G06F 11/34* (2006.01)

(52) U.S. Cl.
CPC ........ *G06F 9/5083* (2013.01); *G06F 11/3006* (2013.01); *G06F 11/3442* (2013.01); *G06F 2209/5019* (2013.01)

(58) Field of Classification Search
None
See application file for complete search history.

(56) References Cited

U.S. PATENT DOCUMENTS

| 8,620,921 B1 | 12/2013 | Susarla et al. |
| 2014/0282503 A1 | 9/2014 | Gmach et al. |

FOREIGN PATENT DOCUMENTS

| EP | 3113025 | 1/2017 |

OTHER PUBLICATIONS

"Low level Metrics to High Level SLAs—LoM2HiS framework: Bridging the gap between monitored metrics and SLA parameters in cloud environments". Vincent C. Emeakaroha, et al. High Performance Computing and Simulation, 2010, International Conference on, IEEE Piscataway NJ. 8 Pages.
Preliminary Search Report for French application No. FR1854716, dated Jan. 18, 2019, 4 pages.

*Primary Examiner* — Eric C Wai
(74) *Attorney, Agent, or Firm* — Arc IP Law, PC; Joseph J. Mayo

(57) ABSTRACT

The invention relates to a device for optimizing the utilization of the resources on an IT infrastructure (1), the IT infrastructure (1) including one or more IT structures (3) hosting a plurality of application components (2a, 2b, 2c, 2d), said device including a storage module (10) capable of storing a plurality of repositories, a load planning module (20) capable of calculating for a time period required resource levels, an IT structure selection module (30) configured to select IT structures (3) required for the time period and an optimization module (40) configured to generate at least one placement plan including data of IT structures to be used and at least one evolution plan listing resource changes to be made.

15 Claims, 3 Drawing Sheets

Figure 1:
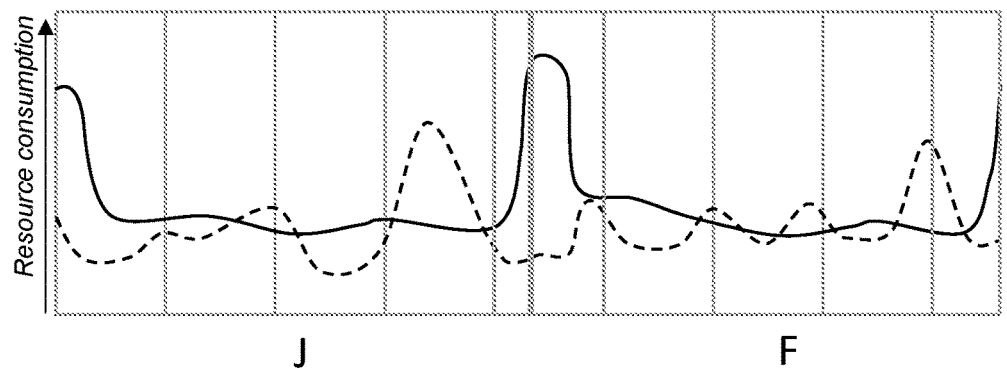

DEVICE AND METHOD FOR OPTIMIZING THE UTILIZATION OVER TIME OF THE RESOURCES OF AN IT INFRASTRUCTURE

The invention relates to the field of monitoring the performance of IT infrastructures and more particularly to that of improving the performance of systems in production. In particular, the invention relates to a method for optimizing the utilization over time of the resources of an IT infrastructure in production and a device capable of implementing said method.

PRIOR ART

IT infrastructures are a large part of a company's investment. Properly managing them is a strategic issue in order to control their costs, but also to ensure a reliable and optimized access to the different business data of the information system.

Over time, information system administrators generally have their IT infrastructure evolve so that they always offer high-performance business application services tailored to the needs of their organization. For example, following an increase in a certain group of users, there may be an increase in resource consumption by some business applications and therefore it may be advantageous to reorganize this IT infrastructure. Alternatively, a change in application components, a modification of an application component resulting in a reduction of its resource consumption, or an improvement of an IT infrastructure may lead to an increase in available resources. There are methods for measuring performance ("Benchmark" in Anglo-Saxon terminology) with the objective of dimensioning, according to a given utilization, a new IT infrastructure hosting an application chain and validating its performance and endurance.

However, these systems seem insufficient today. Indeed, when an application is in production on an IT infrastructure, it can experience significant utilization changes (namely workload) over time with variations over the day (working hours versus the rest of the day), over the week (Wednesday as a holiday for some employees, days of rest versus days worked), over the month and the year (monthly, quarterly, annual closing period, etc.).

These variations in utilization are reflected in practice at the hardware level by similar variations in resource needs. Thus, information system administrators also have to deal with variations in resource utilization over time, forming periods of more or less severe constraints on IT infrastructures.

To this day, solutions exist, allowing through portals to monitor the utilization of resources and compare them at application service levels. This automatic analysis can generate alerts sent to the operations manager who shall decide on possible corrective actions to be taken. For example, it has been proposed (U.S. Pat. No. 8,620,921) a data storage prediction model capable, when a service level objective violation occurs, of specifying where storage can take place. But none of these solutions currently generates recommendations for evolutions of the infrastructure. It is up to the operations manager to deduce from the alerts the evolutions that need to be made. Recently, an automated system has been proposed (EP3113025) that monitors all the servers constituting a link chain and that, by analyzing the metrics, allows to develop, in advance, proposals for resizing the link chain in relation to the application load. In particular, such a system, which mentions types of evolution, is proposed in order to anticipate the infrastructure adjustments required to accelerate the response to incidents resulting in a degradation or even an interruption of the services delivered by the application. However, this system does not allow to specifically propose the hardware evolutions to be implemented by the administrator to meet the identified resource needs that can be easily implemented.

Therefore, due to a lack of equipment and time, application administrators size the servers used by these applications in order to guarantee a good level of SLA during peak periods (therefore a maximum utilization) which means that at a given moment, a more or less important part of the resources is not used while another part is very or too much solicited.

Thus, there is a need for new methods or devices for managing an IT infrastructure so that it has a resource amount adapted to the exact need of the information system (IS) applications.

Technical Problem

The invention therefore aims to overcome the disadvantages of the prior art. In particular, the aim of the invention is to automatically generate a plan for the evolution of the resources of an IT infrastructure. Thus, the invention has the advantage of facilitating the adaptation of the IT infrastructure to the needs of business applications. For example, the device according to the invention allows to provide an IS administrator with a placement plan and an evolution plan indicating the resources to be changed to meet the needs of business applications for the coming period. Thus, the aim of the present invention is to optimize, by periods, the utilization of the resources of an IT infrastructure, in particular by optimally allocating the available resources. Such an evolution plan of the infrastructure for the next period allows to minimize the number of servers used and can advantageously balance consumption on the various servers in order to improve their resilience.

BRIEF DESCRIPTION OF THE INVENTION

To this end, the invention relates to a device for optimizing the utilization of resources on an IT infrastructure, the IT infrastructure including one or more IT structures hosting a plurality of application components, said device including:
  A storage module capable of storing a plurality of repositories including:
    A capacity management repository configured to store at least two time periods associated with different resource needs,
    An application profile repository configured to store, preferably for each application component, data identifying the one or more IT structures used by an application component and one data item corresponding to a criticality indicator of said application component,
    An IT infrastructure repository configured to store server resource characteristics for at least one IT structure of the IT infrastructure, said server resource characteristics comprising an evolution rule data item as well as a data item corresponding to an evolution complexity indicator,
    An available resource repository configured to store available resource characteristics, said available resource characteristics including available amount data as well as a data item corresponding to a resource provision complexity indicator, and An execution rule repository configured to store data corresponding to maximum levels of resource utilization;

A load planning module capable of calculating for a time period, from the data of the capacity management repository and the application profile repository, required resource levels;

An IT structure selection module configured to select, from the calculated required resource levels and the data from the IT infrastructure repository and the available resource repository, IT structures required for the time period; and An optimization module configured to generate, from the selection of the IT structures required for the time period and the data from the execution rule repository, at least one placement plan including data of IT structures to be used and at least one evolution plan listing resource changes to be made.

The device according to the invention allows to optimize the utilization of resources of an IT infrastructure. In particular, it allows, in a fast and automatic way, to generate an evolution plan listing the changes in resources to be made to place the IT infrastructure in optimal conditions for a given period of activity. It is able to quickly determine which resources could be decreased or increased on the IT infrastructure and the deployment of the application components in order to maintain a quality of service at a desired level. Advantageously, it allocates the available resources in an optimal way with the objective of minimizing the number of servers used and balancing consumption on the various servers in order to improve their resilience.

According to other optional characteristics of the device:

it further includes a plan catalog configured to store a plurality of placement and/or evolution plans. The presence of such a catalog gives the device the possibility to store and then select, via a selection module, a pre-existing plan and thus to reduce the time of preparing the optimization;

the capacity management repository further includes a data item corresponding to a reliability coefficient of the resource needs. Such a reliability coefficient allows to take into account at least part of the variability in resource consumption of the application chains over time depending on the circumstances;

the evolution rule data item is selected from the minimum of the resource, the maximum of the resource, and/or the evolution step of the resource. Thus, the system has data allowing it to determine which evolutions to recommend depending on the resource needs;

the available resource repository further includes a data item corresponding to a compatibility indicator. The compatibility indicator allows to determine on which IT structure the available resource can be installed, added or changed. For example, it allows to determine on which IT structure the available resource can be installed;

the IT structure selection module is configured to further generate a list of resources required for the time period particularly from data corresponding to levels of resource utilization on the IT structures, over the current period. Thus, it is possible to generate a list of IT structures that should be used in order to make all the resources required for the application components available for the next period;

the optimization module is configured to generate at least one placement plan having resource consumption homogenized between different IT structures. Thus, the expected resource consumption is homogenized between the different IT structures involved and the resilience of the IT infrastructure is thereby improved;

the optimization module is configured to generate a plurality of placement plans and evolution plans and select a placement plan and an evolution plan. This allows for a better homogenization of resource utilization.

The invention further relates to a method for optimizing the utilization of the resources of an IT infrastructure, said method being preferably implemented by an optimization device according to the invention, and said method including the following steps of:

Calculating, by the load planning module, the resource levels required for a period of time, from the data of the capacity management repository and the application profile repository;

Selecting, by an IT structure selection module, the IT structures required for the period of time, from the calculated levels of resources required and the data from the IT infrastructure repository and the available resource repository;

Generating, by an optimization module, at least one placement plan including data of IT structures to be used and at least one evolution plan listing changes in resources to be made, from the selection of IT structures and the data from the execution rule repository.

The method according to the invention allows to optimize the utilization of resources of an IT infrastructure. In particular, it allows, in a fast and automatic way, to generate an evolution plan listing the changes in resources to be made to place the IT infrastructure in optimal conditions for a given period of activity. It is able to quickly determine which resources could be decreased or increased on the IT infrastructure and the deployment of the application components in order to maintain a quality of service at a desired level.

In addition, according to an optional characteristic of the method, it further includes a step of monitoring the IT infrastructure in order to determine whether the execution rules are complied with. This may also comprise a step of determining whether the service levels offered by the IT infrastructure are being met.

Other advantages and characteristics of the invention will appear upon reading the following description given by way of illustrative and non-limiting example, with reference to the appended figures which represent:

FIG. 1, a calendar of resource consumption for the months of January (J) and February (F) of two application chains.

Figure 2:
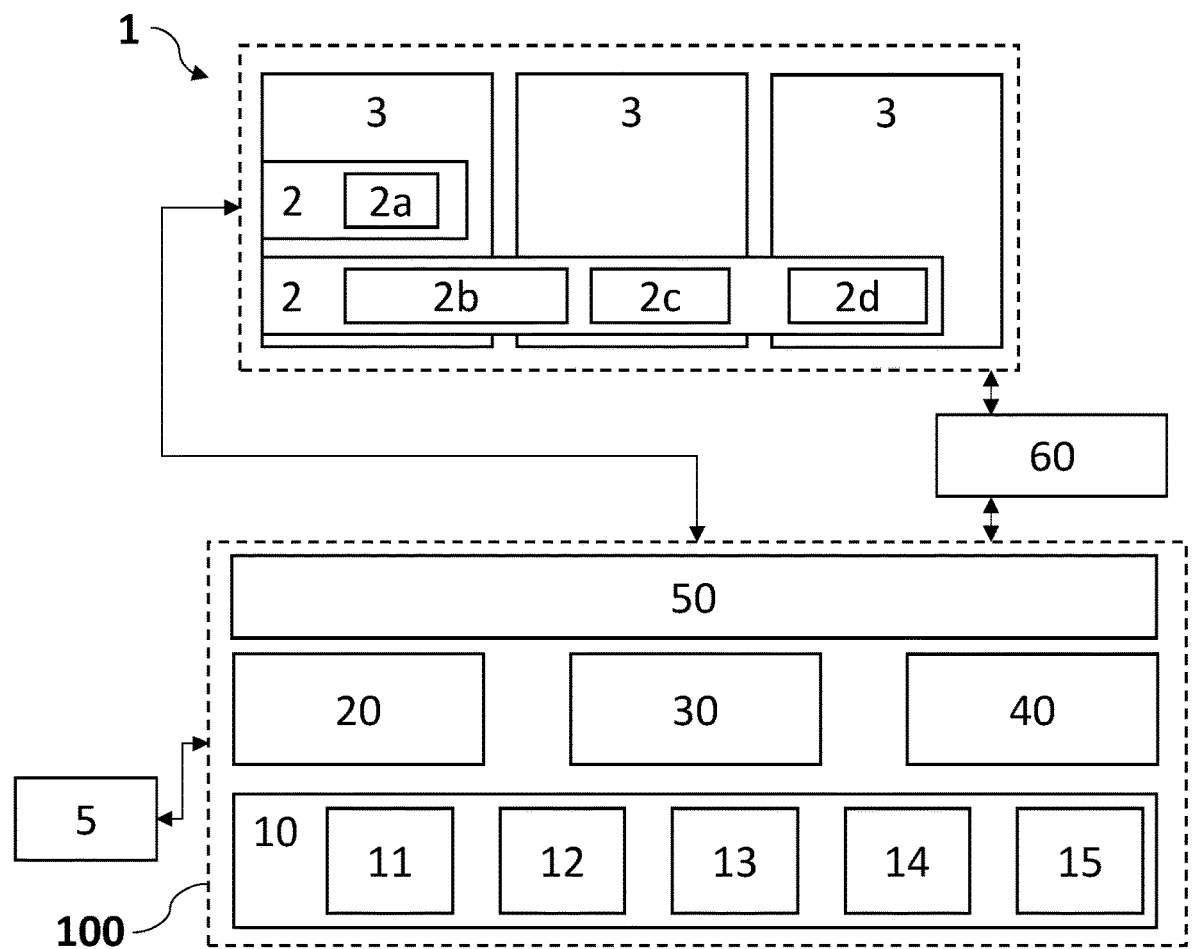

FIG. 2, a schematic view of the elements of the system for optimizing the utilization of the resources of an IT infrastructure according to one embodiment of the invention.

Figure 3:
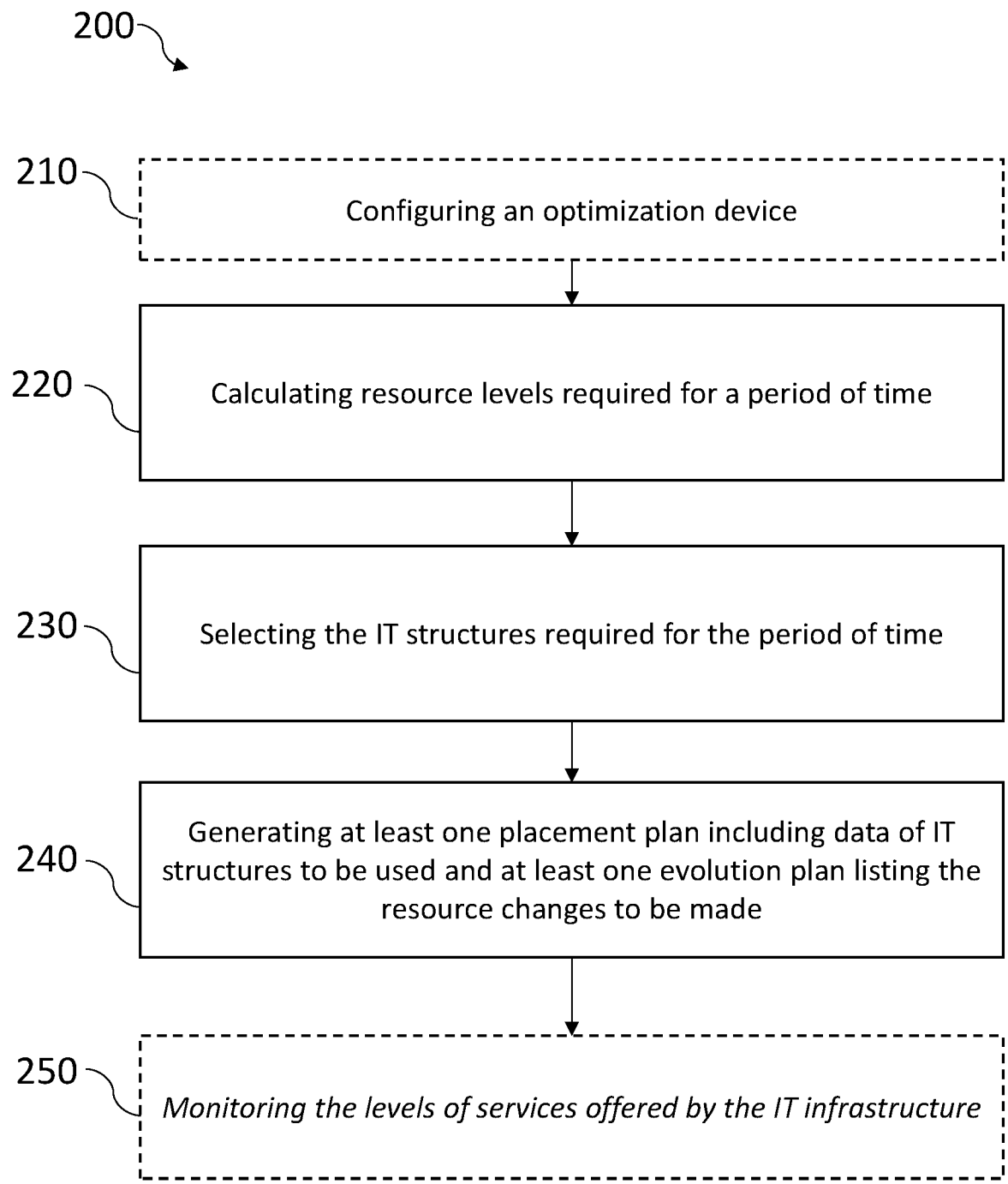

FIG. 3, a schematic representation of a method for optimizing the utilization of resources according to the invention. The steps framed by dotted lines are optional.

Figure 4:
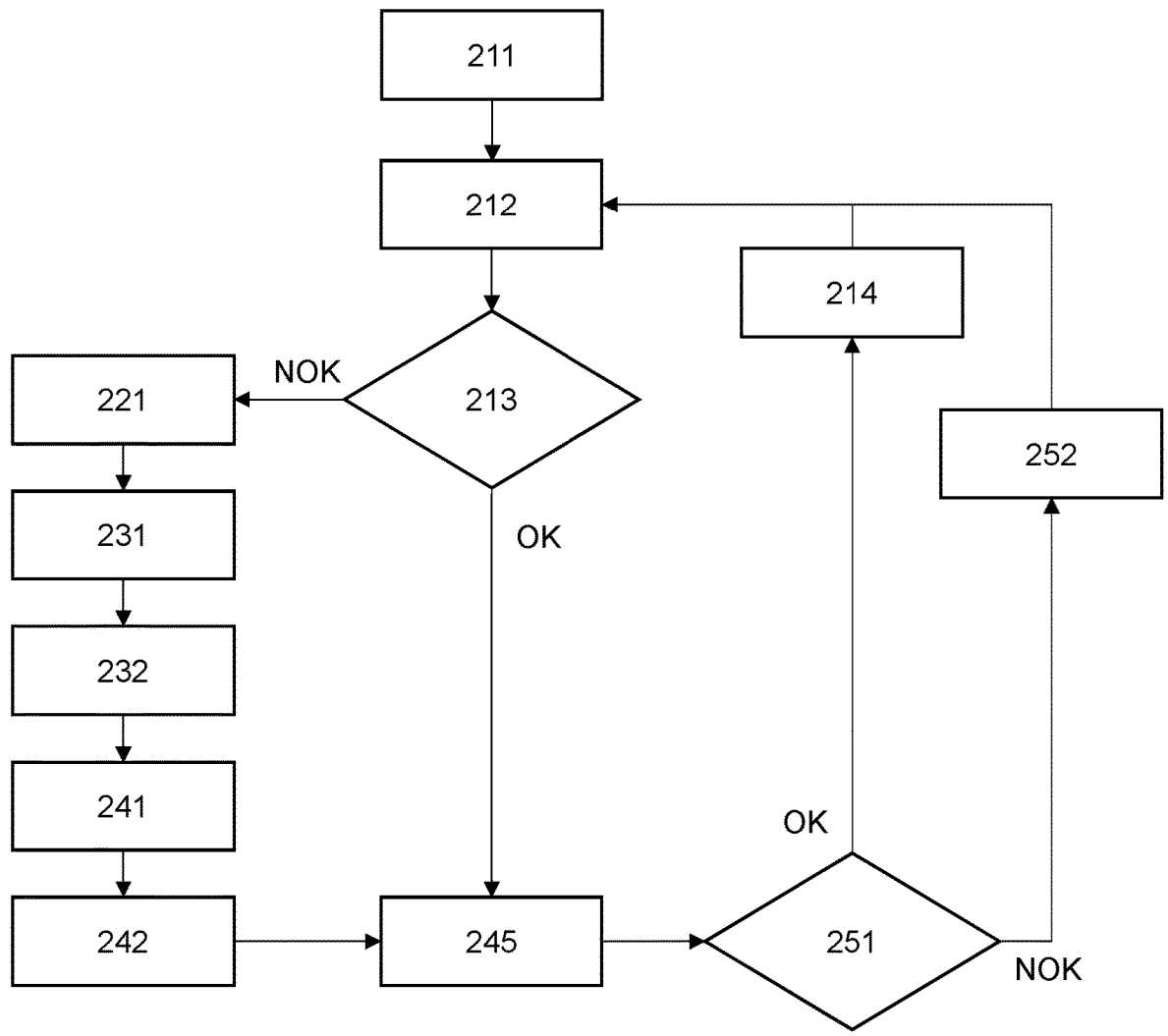

FIG. 4, a schematic view of an optimization method according to one embodiment of the invention.

DESCRIPTION OF THE INVENTION

In the following description, by "Resource" or "Hardware Resource" are meant, parameters, capabilities or functions of IT devices allowing an application component, an application or an application chain to operate. A same IT device is generally associated with several resources. Similarly, a same resource is generally shared between several application chains. For example, the term "resource" may include: network disks characterized, for example, by their inputs/ outputs, reading/writing onto disks, the utilization rate of the memory, a network characterized by its bandwidth, a processor characterized, for example, by its utilization (in percent) or the cache occupancy rate, a random access memory characterized by the allocated amount, or more generally the latency time of a process or packet losses. It is not necessary to monitor all the resources of an IT infrastructure to implement the method according to the invention and it is possible to form a group of critical resources, the utilization of which is particularly important. By "resource utilization" is meant, the consumption of a resource, for example by a business application.

By "level of a resource" or "levels of resources" is meant, within the meaning of the invention, an amount of resource. For example, this may correspond for network disks to the number of available network disks or the amount of memory available on these network disks, for a processor, to the number of cores or the number of processors or the size of the caches, for a random access memory, to the available amount, and for ports, to the number of ports that can be opened simultaneously. The initial level of a resource corresponds to the amount of resource available on the IT infrastructure for the one or more application chains. The "step of a resource" can be, on the one hand, the minimum amount of resource that can be added or subtracted during a modification step and, on the other hand, a multiple of the modification the level of said resource can be subjected to. Some resources have a high particle size (for example servers) while others have a small particle size (for example available random access memory).

By "utilization level of a resource" is meant, within the meaning of the invention, a value representative of the consumption or occupancy of said resource during the operation of an application chain. For example, the utilization value may correspond for network disks to their inputs/outputs, writing/rewriting on the discs, the utilization rate of the memory, for a network to its bandwidth, for processors, to their utilization (in percent) or to the cache occupancy rate, for a random access memory, to the used amount and for ports, to the number of ports that have been opened simultaneously during the operation of the method. The utilization value is advantageously reduced to the percentage of the level of the resource.

By "predetermined maximum utilization threshold" is meant, within the meaning of the invention, a parameter maximum value associated with each resource allowing for a proper operation of said resource. For example, this corresponds to the maximum acceptable limits of resource consumption for an IT structure hosting one or more application components. These limits can be real or hypothetical and generally correspond to a utilization level beyond which malfunctions can occur resulting in a shutdown of the resource, of the IT structure or at the very least in decreases in quality of service. This threshold can be predetermined by a user via a configuration file and a Human Machine Interface (HMI). The term "malfunction", within the meaning of the invention, corresponds to the occurrence of a hardware incident or congestion on the IT structure hosting an application component.

For example, Table 1 below shows the predetermined maximum utilization thresholds for three resources.

TABLE 1

| | CPU1 | Network utilization | Disc utilization |
|---|---|---|---|
| Predetermined maximum utilization threshold | 80% | 350 KBps | 60 B/s |

The expression "quality of service" or level of service, within the meaning of the invention, corresponds to an appreciation of the quality of service provided by an application chain. The expression "quality of service parameter", within the meaning of the invention, corresponds to subjective or objective criteria such as latency of a process, packet losses, throughputs, resource utilization values and response times by request. Thus, there is generally a plurality of quality of service parameters. In particular, there may be a different threshold response time for each one of the different requests or a global response time.

The expression "predetermined quality of service parameter threshold", within the meaning of the invention, corresponds to a parameter value to which a third party can commit in order to ensure good performance for critical applications of an organization and as may be defined in a service level agreement (SLA for "Service-level agreement"). For example, a threshold may be of the type: all response times are less than 3 seconds. Nevertheless, it may be advantageous to have thresholds detailed according to business actions. For example, a request implementing a file print may have a higher response time threshold than a request for displaying a web page. The predetermined quality of service parameter thresholds may also include predetermined maximum utilization thresholds. In the context of the invention, a critical resource is a resource for which decreasing its resource level or exceeding the predetermined maximum utilization threshold would have a significant impact on one or more application component service levels.

By "IT infrastructure" is meant, within the meaning of the invention, a set of IT structures (namely IT devices) able to operate an application or an application chain. The IT structure can be a server and can, for example, consist of a presentation server, a business server, and a data server. The IT infrastructure can also be a test server with the same resources as a production server or a clone of a production virtual server. Preferably, the IT structure is a server.

The expression "application chain", within the meaning of the invention, corresponds to a set of applications, interconnected by a flow of information and designed to provide, through several processes, one or more functionalities that can be subject to a service level agreement. The expression "application component", within the meaning of the invention, corresponds to a component of an application. The combination of application components is often necessary for operating applications, especially business applications, such as a web application, a content sharing platform or a calculating platform. The application components of the IT infrastructure include, for example, an ftp server, an email server, a Java application server and/or one or more databases.

By "probe" or "computer probe" is meant, within the meaning of the invention, software associated with a piece of equipment that allows to perform, manage and send back to a piece of IT equipment measurements for informing, among other things, about the operation state of the resources or service level.

By "process", "calculate", "determine", "display", "extract", "compare" or more broadly "executable operation" is meant, within the meaning of the invention, an action performed by a device or a processor unless the context indicates otherwise. In this regard, the operations relate to actions and/or processes of a data processing system, for example a computer system or an electronic computer device, which handles and transforms the data represented as physical (electronic) quantities in the memories of the computer system or other devices for storing, transmitting or displaying information. These operations may be based on applications or software.

The terms or expressions "application", "software", "program code", and "executable code" mean any expression, code or notation, of a set of instructions intended to cause a data processing to perform a particular function directly or indirectly (for example after a conversion operation to another code). Program code examples may include, but are not limited to, a subprogram, a function, an executable application, a source code, an object code, a library and/or any other sequence of instructions designed for executing on a computer system.

By "processor", within the meaning of the invention, is meant at least one hardware circuit configured to perform operations according to instructions contained in a code. The hardware circuit may be an integrated circuit. Examples of a processor include, but are not limited to, a central processing unit, a graphics processor, an application-specific integrated circuit (ASIC), and a programmable logic circuit.

By "coupled", within the meaning of the invention, is meant connected, directly or indirectly, with one or more intermediate elements. Two elements may be coupled mechanically, electrically, or linked by a communication channel.

In the following description, the same references are used to designate the same elements.

FIG. 1 illustrates a possible evolution, over two months (January—J, and February—F), of the resource consumption (here the CPU occupancy rate) of two application chains hosted by an IT infrastructure. In this example, the resource consumption by a first application, shown by the solid line curve, is higher at the beginning of the month while the resource consumption by a second application, shown by the dotted line curve, is higher at the end of the month. This figure illustrates the variations that IS administrators face when managing infrastructures. In order to manage over time the variations in resource needs of application chains, it is common for IT infrastructures to include resources that allow them to constantly meet the observed maxima. Thus, there is a significant waste of resources during periods of low activity and operational disruptions can occur if the needs evolve.

In order to improve the efficiency of infrastructures, it is desirable to be able to periodically evolve their resources so that they meet the needs of the application chains for a given period. To do this, the inventors have developed a new device 100 for optimizing the utilization of the resources of an IT infrastructure. This device advantageously allows to generate an optimization plan including, on the one hand, data of IT structures (for example servers) to be used and, on the other hand, data for the evolution of the resources to be implemented. Thus, unlike the devices or systems of the prior art, the IS administrator knows for a given period of time which placement is to be implemented and what the changes in resources (for example hardware changes) to be made are. In particular, based on a plurality of repositories, this device is configured to schedule the load over a given period, select the IT structures (for example infrastructure servers) to be used, and anticipate the hardware evolutions to be performed as well as the placement (namely deployment) of the application chains. FIG. 2 schematically illustrates a non-limiting functional representation of an embodiment according to the invention of such a device.

This device 100 is connected to an IT infrastructure 1 alternatively, it can be integrated with said IT infrastructure 1. The IT infrastructure 1 is more particularly an IT infrastructure in production, the resources of which are used by the application chains 2 consisting of application components 2a, 2b, 2c, 2d. When an action is taken to the device according to the invention, it is actually performed by a microprocessor of the device controlled by instruction codes stored in a memory of the device 100. If an action is taken to an application, it is actually performed by a microprocessor of the device 100 in a memory of which the instruction codes corresponding to the application are stored. When the device 100 according to the invention sends or receives a message, this message is sent or received by a communication interface of the device 100.

FIG. 2 schematically illustrates an embodiment of a device 100 for optimizing the utilization of the resources of an IT infrastructure 1 by application chains 2. In particular, this device may comprise at least one IT machine and software for implementing the optimization method according to the invention.

In addition, in FIG. 2 is displayed a user terminal 5 via which a user can interact, for example via a communication network, with the device 100 according to the invention. The user terminal 5 is a computer, a digital tablet, a mobile phone, or more generally any device allowing a user to send requests, via a communication network (for example LAN, WLAN, or PAN, database log, email), to the device 100 for optimizing the utilization of resources. In this respect, the user terminal 5 may be provided with a client application allowing to send requests or instructions to the device 100 for optimizing the utilization of resources and interpreting the answers thereof. This client application is, for example, a FireFox®, Fennec®, Opera®, Opera Mobile®, Internet Explorer®, Google Chrome® web browser for example, or an ftp browser (such as FileZilla®).

The IT infrastructure 1 may include a plurality of IT resources 3 such as servers. Each of the IT structures 3 can host one or more application chains 2. In addition, the user terminal 5 is further configured to receive a response, from the IT structures 3, to its request. These requests/responses are made in the context of business actions initiated by the user in order to benefit from an application service provided by the application chain that is deployed upon the IT infrastructure 1. The application chains 2 are made available by one of the IT structures 3 on a request from the user terminal 5. The services provided by the application chains 2 may comprise, for example, an email service, a diary service, navigation in an information system, an online database query service, a remote learning service, an online sale and/or booking service, an electronic form filling and submission service, a streaming service, a content download and/or upload service.

Each IT structure 3 may comprise a microprocessor, storage means (such as a hard disk, whether local or remote), and a communication interface (for example a network interface of the Ethernet-, FiberChannel-, InfiniBand-, etc.-type). In particular, an IT structure 3 can be a physical server or a virtual server.

The device 100 according to the invention includes in particular a storage module 10 capable of storing a plurality of repositories. The storage module 10 may comprise a transient memory and/or a non-transient memory. The non-transient memory may be a medium such as a CD-ROM, a memory card, a local hard drive or a hard drive hosted by a remote server. Preferably, the storage module 10 takes the form of a local hard drive. In particular, the storage module 10 is able to record, for example, in the form of one or more files, data generated by an HMI or by consumption probes or data acquired via a communication module. This data may, for example, correspond to data relating to the capacities of the IT infrastructure 1, the needs of the application chains, the available resources or predetermined operating parameters or identified time periods (for example activities).

In particular, the storage module 10 includes a capacity management repository 11. Such a repository 11 allows to memorize the evolution of different metrics linked to the utilization of the resources (processor, inputs/outputs, memory, etc.) in order to anticipate the adjustments of the IT infrastructure 1. Such adjustments to the IT infrastructure 1 are often necessary to prevent malfunctions and to avoid degradation or even interruption of service. Thus, the objective of the capacity management repository 11 is to ensure that the IT infrastructure meets, at all times, the requirements of quality of service in alignment with the business needs.

In particular, the capacity management repository 11 allows to determine the activity cycles of the various IS applications and to deduce several specific periods therefrom. Thus, the capacity management repository 11 is advantageously configured to store at least two periods of time (or activities) associated with different resource needs.

The data stored via the capacity management repository 11 as well as the activity periods may have been entered, from start-up or over time, by a user via an HMI. Indeed, the IS administrator generally knows the utilization history as well as the forecasts. Alternatively, the data stored via the capacity management repository 11 may have been acquired via probes 60 (computer probes or consumption probes).

There are, more particularly, for each period of time (for example time interval associated with different resource needs), storing of a start date and of an end date of the period and storing of the resource need.

In addition, the stored values of the resource needs are, for example:
  a start date of the period,
  an end date of the period, and/or
  a list of the application components 2a, 2b, 2c, 2d with their resource needs (for example random access memory consumed, disk memory consumed, CPU utilization rate)

The resource needs of the application components 2a, 2b, 2c, 2d can be estimated from past period needs, from utilization prediction data of the application components or communicated via an HMI. Table 2 below illustrates a capacity management repository according to one embodiment for a given period.

Table 2 below illustrates a capacity management repository 11 according to one embodiment for a given period.

TABLE 2

|  | CPU | Network throughput | Random access memory |
|---|---|---|---|
| Application component 1 | 20% | 350 Kbps | 900 MB |
| Application component 2 | 70% | 1000 Kbps | 2651 MB |
| Application component 3 | 30% | NA | 300 MB |

As already mentioned, resource consumption of the application chains can vary over time and depending on the circumstances. It has been noted that the performance of the capacity management repository 11 could be improved by including an indicator for taking into account at least some of this variability.

Thus, preferably, the capacity management repository 11 further includes a data item corresponding to a reliability coefficient, said data item corresponding to a reliability coefficient being representative of the reliability of the forecasts depending on the behavior in previous periods and/or human forecasts for future periods. The data item corresponding to a reliability coefficient may, for example, be proportional to the variability in resource consumption measured over previous periods or may be entered by a user.

The reliability coefficient can advantageously be predetermined and stored via an HMI. In addition, preferably, the data item corresponding to a reliability coefficient can be updated via an HMI or automatically via a probe data processing module.

Advantageously, the reliability coefficient corresponds to a value, for a given period, automatically generated depending on past resource consumption values and it can preferably be modified by a user (for example the IS administrator).

In addition, the capacity management repository 11 can be coupled to a monitoring module capable of sending an alert if the maximum threshold for resource utilization is exceeded. Such an alert can be associated with a request for an evolution of the IS.

With regard to the variability of the utilization of the application components 2a, 2b, 2c, 2d as a function of time, it is possible to define a plurality of time periods. Where each time period can have different resource needs. The definition of a plurality of time periods can be performed from:
  data volume values to be processed by the applications as a function of time, where these values can be measured by probes or estimated by users and then stored in the system,
  resource consumption values measured as a function of time, obtained for example by probes or
  information from business activities.

Thus, the periods can be defined without the need for calculations and only based on user experience. In this case, a segmentation module is configured to perform a definition of a plurality of time periods from estimated values based on the business activities supported by the IT infrastructure.

When the time periods are defined in relation to the resources consumed, it is preferable to take into account significant resources, that is to say the resources, the consumption of which is close to their criticality threshold when executing the application components. It is possible, for example, to pay particular attention to reading-writing on the disks. Advantageously, defining a plurality of time periods is performed from the volumes of data to be processed by the application chains.

The definition of a plurality of time periods can also be performed from measured values of resource consumption when executing the application components. These values can be obtained by a plurality of probes 60 configured to monitor the behavior of the IT infrastructure. The plurality of probes 60 can allow more particularly to identify periodicities in resource consumption.

The storage module 10 further includes an application profile repository 12. The application profile repository 12 is particularly configured to store, for each application component, data identifying the one or more IT structures used by the application component and a data item corresponding to a criticality indicator of said application component.

The data identifying the one or more IT structures used by the application component generally corresponds to a single numeric or alphanumeric data item, allowing to identify with certainty the hardware (for example the one or more IT structures 3) used by said application component.

The criticality indicator of the application chain can be a numeric or alphanumeric value. This indicator can, for example, correspond to a score, a ranking, a grade, or even a category. Such an indicator allows to know the importance of the application component considered. For example, this can allow the behavior of the device to be configured as close as possible to the needs of end users. Thus, an application such as a database that is frequently accessed by many different application chains may have a high criticality indicator because a failure of this application chain would result in the failure of several other application chains. Similarly, a high criticality indicator may be assigned to an application chain subject to SLAs with high penalties.

Table 3 below illustrates an application profile repository 12 according to an embodiment where the IT structure 1 (S1) is a physical server and the IT structure 2 (S2-Virt) is a virtual server.

TABLE 3

| Identifier of the application component | IT structure | Criticality indicator |
| --- | --- | --- |
| Application component 1 | S1 | 1 |
| Application component 2 | S1 | 5 |
| Application component 3 | S2-Virt | 3 |

The storage module 10 also includes an IT infrastructure repository 13. The IT infrastructure repository 13 is particularly configured to store server resource characteristics for at least one IT structure 3 of the IT infrastructure 1, with said server resource characteristics including, preferably for each of the resources, an evolution rule data item as well as a data item corresponding to an indicator of evolution complexity.

The IT infrastructure repository 13 can store the characteristics of all infrastructure resources. Nevertheless, such monitoring can be very cumbersome to implement. Thus, preferably, the IT infrastructure repository 13 is configured to store the characteristics of the infrastructure critical resources.

The evolution rule data item can advantageously correspond to a set of evolution rules such as the minimum of the resource, the maximum of the resource, and the evolution step of the resource. In particular, the minimum and maximum of the resource can be entered in terms of the number (for example maximum number of memory locations), but also in terms of the amount (for example maximum CPU power regarding the available components).

In addition, the data item corresponding to an indicator of evolution complexity is representative of the complexity for evolving (namely decreasing and/or increasing) the resources of the IT structure 3. Indeed, adding or removing a random access memory and adding a disk are relatively easy and quick actions, while removing a disk is a more delicate operation. In addition, adding power conferred to a virtual server is very easy.

The server resource characteristics can also include data on the current level of resources. This can then match a census of the resources present in the IT infrastructure 1, and/or a list of available servers in the IT infrastructure (for example the one or more data centers).

The data stored via the IT infrastructure repository 13 may have been entered, either from start-up or over time, by a user via an HMI. Preferably, the data stored via the IT infrastructure repository 13 may have been automatically recorded when a new resource is detected. Indeed, changing the level of a resource can influence the characteristics of the resources (for example the evolution step). Thus, preferably, the IT infrastructure repository 13 is able to update the server resource characteristics after at least one resource in an IT structure 3 has been changed.

Table 4 below illustrates an IT infrastructure repository 13 according to one embodiment.

TABLE 4

| Resource | Current level | Min | Max | Evolution step | Complexity (increase/decrease) |
| --- | --- | --- | --- | --- | --- |
| S1 - Memory | 16 GB | 8 GB | 32 GB | 2 GB | 2 |
| S1 - Disc | 8 TB | 4 TB | 16 TB | 4 TB | 2/4 |
| S2 - Virt - Memory | 2 GB | 2 GB | 10 GB | 1 GB | 1 |

The storage module 10 includes an available resource repository 14. The available resource repository 14 is particularly configured to store available resource characteristics, said available resource characteristics including available amount data as well as a data item corresponding to a resource provision complexity indicator.

Thus, this repository 14 is the one corresponding to the resources available for evolving the servers of the IT infrastructure 1. In particular, it can contain for each resource: its type, its amount, the list of compatible servers . . . . Thus, the available resource characteristics can preferably include:
- a data item identifying the available resource,
- a data item on the type of resource available,
- a list of IT structures 3 (for example servers) compatible with the available resource, and/or
- a data item on the resource available amount.

Advantageously, the available resource repository 14 further includes a data item corresponding to a compatibility indicator. The compatibility indicator allows to determine on which IT structure the available resource can be installed.

The data item corresponding to a resource provision complexity indicator is a data item representative of the complexity of making the resource available to the IT structure 3 in the context of a possible evolution. For example, depending on the resources, these may be in stock (namely low complexity) or already used on another server (namely high complexity).

The data stored via the available resource repository 14 is generally entered by a user, via an HMI. The data stored in the available resource repository 14 can also be received via the communication module and come from software for managing the available resource stocks.

Table 5 below illustrates an available resource repository 14 according to one embodiment.

TABLE 5

| Resource type | Compatibility | Amount | Complexity indicator |
| --- | --- | --- | --- |
| Disc - 4 TB | S1, S3 | 10 | 1 |
| Memory - 2 GB | S1, S3 | 10 | 3 |
| Memory - 1 GB | S2-Virt | 8 GB | 1 |

The storage module 10 includes an execution rule repository 15. The execution rule repository 15 is particularly configured to store data corresponding to maximum levels of resource utilization.

The execution rule repository 15 can store execution rules specific for each of the resources of the IT infrastructure 1. Nevertheless, such a repository can be very cumbersome to implement. Thus, preferably, the execution rule repository 15 is configured to store execution rules by resource category. In particular, the execution rules can be specified depending on the application components. Alternatively, they can be defined by the type of resources and by the IT structure (for example servers). Indeed, the application components may have different behaviors and some application components could be allowed to consume resources beyond a predetermined threshold (for example a database may be authorized to consume an amount of memory of up to 90%)

The maximum utilization levels stored by the execution rule repository correspond to levels beyond which there is an increased risk of non-compliance with predetermined SLAs. In particular, this allows to define the maximum acceptable limits of resource consumption for each IT structure 3 (for example server).

The data stored via the execution rule repository 15 may have been entered, either from start-up or over time, by a user via an HMI.

In addition, they can be modified to comply with predetermined SLAs. As will be detailed later, such execution rules can be used to invalidate a placement plan (namely a deployment plan) which would contravene one or more of these rules.

Table 6 below illustrates an execution rule repository 15 according to an embodiment.

TABLE 6

| Resource type | IT structure | Application component | Maximum threshold |
|---|---|---|---|
| Memory | S1 | na | 80% |

The information and data have been presented, in an organized way, in the form of independent repositories 11, 12, 13, 14, 15. Nevertheless, the repositories can be nested with each other within one or more repositories. The importance being mainly on the data stored via this or these repositories.

The system 100 according to the invention particularly includes a load planning module 20 capable of calculating the levels of resources required for a period of time. In particular, the load planning module 20 is able to calculate this from data from the capacity management repository 11 and the application profile repository 12. The period of time corresponds to a period of activity (namely production) on the IT Infrastructure 1 and the resource levels required correspond to the levels of resources required to operate the application components regarding, in particular, the utilization thereof in production.

In particular, the load planning module 20 is advantageously configured to calculate, for a given period of time, the resource levels required for implementing the application components.

Thus, the load planning module 20 allows, for example, for a period of time to come, to have information on the global resource needs of the various virtual machines or physical servers supporting the applications of the information system IS.

Advantageously, the calculated values of the resource levels required to implement the application components can take into account the values of the predetermined reliability and criticality coefficients.

The device 100 according to the invention particularly includes an IT structure selection module 30 configured to select the IT structures 3 required for a period of time.

Thus, it is possible to generate a list of the IT structures 3 (for example servers) that should be used in order to make all the resources required for the application components 2 available for the next period. Advantageously, the module 30 for selecting the IT structures 3 is configured to select in priority the IT structures 3 used in the current period. The IT structure selection module 30 can also be configured to propose to adapt, if needed, the level of resources of these IT structures 3 by taking into account, in particular for each resource, their evolution rules, the complexity of the implementation of the evolution, but also the available resources repository 14.

In particular, the IT structure selection module 30 is configured to make this selection from the calculated levels of resources required and the data from the IT infrastructure repository 13 and the available resources repository 14.

In particular, the IT structure selection module 30 can be configured to generate a list of required resources, from:
  data relating to the resources used by the application components 2, over the current period, and/or
  data relating to the evolution rules, the complexity of the implementation of the evolution, but also the available resource repository 14.

Advantageously, the additional parameters taken into account by the selection module 30 are selected from:
  the evolution rules of each resource, and/or
  data corresponding to an indicator of the complexity of implementing the evolution.

The device 100 according to the invention also includes an optimization module 40 configured to generate at least one placement plan including data of the IT structures 3 to be used for each application component 2a, 2b, 2c, 2d and at least one evolution plan listing resource changes to be made. The optimization module 40 is particularly configured to generate this from the selection of the IT structures 3 required for the time period and the data from the execution rule repository.

Advantageously, the placement plan includes data on the application components 2a, 2b, 2c, 2d and on the IT structures 3 hosting said application components. In particular, the placement plan allows to determine on which IT structures 3 the application components 2 and resources to be modified will be hosted.

Preferably, the optimization module 40 is configured to generate at least one placement plan such that the IT structures have resource consumption homogenized between different IT structures 3. Thus, the expected resource consumption is homogenized between the different IT structures involved and the resilience of the IT infrastructure 1 is thereby improved. Preferably, this homogenization can take into account the maximum levels of resource utilization defined in the execution rule repository.

In addition, the inventors propose to calculate a plurality of possible plans and retain the one allowing to obtain similar levels of resource consumption (for example the resource utilization level has a difference of less than 20%)

on each IT structure (for example an infrastructure server), while not exceeding the maximum levels of resource utilization.

Thus, the module for generating placement plan is advantageously configured to generate a plurality of placement plans and/or evolution plans. Thus, advantageously, the device according to the invention includes a plan catalog configured to store a plurality of placement and/or evolution plans and a plan selection module, able to select a suitable placement and/or evolution plan. Preferably, the device according to the invention includes a plan catalog configured to store a plurality of evolution plans and a plan selection module, capable of selecting a suitable evolution plan. More preferably, the device according to the invention includes a plan catalog configured to store a plurality of placement and evolution plans and a plan selection module, capable of selecting a suitable placement and evolution plan.

Preferably, the plan catalog contains between 5 and 50 plans, more preferably between 10 and 40, and even more preferably between 10 and 20. These periods of time can then be defined by the user or calculated from data. Preferably, a period of time corresponds to a period of time during which the activity is relatively stable. The time periods can be characterized by differences in the operating characteristics of the application components, such as: the volume of data to be processed, the resources consumed by the application components. The time periods can also be defined during the implementation of the method by a user based on business information.

The optimization module is more particularly configured to determine, for each time period, the optimal placement and/or evolution plan aimed, as a function of the time period, at ensuring compliance with the execution rules while homogenizing resource utilization.

The device 100 according to the invention may also include a communication module 50 capable of exchanging data with third party devices. The communication module 50 is especially configured to transmit a report including for a period a list of the IT structures 3 on which the application components 2a, 2b, 2c, 2d can be deployed and a list of resource changes to be made on the IT structures 3.

The device 100 according to the invention may also include or be coupled with one or more probes 60, in particular to measure resource consumption by the application chains 2. The one or more probes allow to collect data on the consumption of the resources of the IT infrastructure 1, and more particularly of each IT structure 3, or machine, composing it. Several resources can be measured in parallel.

These measurements can be made by a probe, for example a probe of the "Nigel's Monitor" (Nmon) or "Performance Monitor" (Perfmon) type. For example, Nmon probes can allow to display the data of the CPU, memory, swap, network, user information, groups, storage media, on the kernel utilization, or the most consuming processes. Perfmon type probes allow to measure the performance of an IT infrastructure 1. The information collected can, for example, correspond to percentages of resource utilization, response times, processing times, but also the status of the ports, the number of JDBC or JMS message queues, the occupancy rate of the file system, the operating rate of the garbage collector or memory collector (for "garbage collector" in English) for J2EE (for "Java Enterprise Edition" in English) applications.

These probes can be associated with each parameter (for example resource) to feedback the metrics or measurement information, representing, for example, the operating state of the resources and the associated consumption. For each parameter, the one or more probes define a parameter identifier and a parameter value. The parameter values can be monitored continuously or at configurable intervals in order to obtain information for each parameter as a function of time. This information can be stored in a memory such as in the storage module 10. In some embodiments, the device includes an HMI for defining the consumption probes on each machine that feedback the metrics from the utilization of the resources of the machine.

Such resource consumption can be stored in at least one stored matrix table, the number of resources of which defining one dimension of the matrix table, the number of affected time slots of which defining another dimension of the matrix table, and the percentages of resource utilization of which constituting the coefficient of an additional row or column. This information can preferably be written in the form of a machine matrix Mj stored in a memory, with each row of the machine matrix Mj representing a machine resource (CPU, RAM, . . . etc.), each column of the matrix a time slot and each value present in a box of the row of a resource representing the consumption of this resource for the time period defined for the column.

The device 100 according to the invention may further include a human-machine interface (HMI) module, for example in connection with the communication module 50.

The different modules or units are separate in FIG. 2, but the invention may provide various types of arrangement such as a single module cumulating all the functions described here. Similarly, these means may be divided into several electronic boards or gathered on a single electronic board.

According to another aspect, the invention relates to a method 200 for optimizing the utilization of the resources of an IT infrastructure implemented by an optimization device. The method according to the invention can be advantageously implemented by a device 100 according to the invention. FIG. 3 schematically illustrates a method for optimizing the utilization of the resources according to the invention.

As shown in FIG. 3, the optimization method 200 according to the invention comprises a first step 210 of configuring an optimization device. The configuration step 210 may particularly include data storing steps, for example in a storage module 10, corresponding to time periods, reliability coefficients, application component criticality indicators, evolution rules, evolution complexity indicators, current resource levels, resource provision complexity indicators, compatibility indicators and execution rules.

The optimization method 200 according to the invention comprises a step 220 of calculating the resource levels required for a period of time, from the data of a capacity management repository 11 and an application profile repository 12. In particular, this calculation can be carried out by a module having the characteristics of the load planning module 20 according to the invention.

The method according to the invention also includes a step 230 of selecting the IT structures 3 required for the time period, from the calculated levels of resources required and the data from the IT structure repository 13 and the available resource repository 14. In particular, this selection can be made by a module having the characteristics of the IT structure selection module 30.

The method according to the invention also includes a 240 step of generating at least one placement plan including data of the IT structure 3 to be used and at least one evolution plan listing resource changed to be made. These plans are preferably generated from the selection of IT structures 3 carried out in step 230 and data from the execution rule repository 15. In particular, this generation can be carried out by a module having the characteristics of the optimization module 40.

The method according to the invention also includes a step 250 of monitoring the service levels provided by the IT infrastructure 1. In particular, this monitoring can be carried out by probes having the characteristics of the previously described probes 60. This analysis advantageously includes measuring the values of quality of service parameters in response to the application components being put in production on the new IT infrastructure configuration and comparing the measured values of the quality of service parameters with threshold values of quality of service parameters.

One embodiment of the method according to the invention is illustrated in FIG. 3. The method initially includes a configuration step 211. This configuration step aims, in particular, to store the data relating to: the periods of time (namely activities), the reliability indicators, the criticality indicators, the provision or evolution complexity indicators, the evolution rules and/or the execution rules.

When a new period of time is considered 212, the method according to the invention includes a step 213 of checking for the presence, within a plan catalog, of a placement plan and an evolution plan corresponding to said period. If a placement plan and an evolution plan are available for the period, then the evolution and placement plans are executed, otherwise, the method according to the invention includes a step 221 of determining the resources required for executing all the application components on the IT infrastructure (for example for all the virtual machines). In particular, from the capacity management repository 11, are determined global resource needs for the different virtual machines or Partitions supporting the IS applications. The reliability and criticality coefficients can preferably be used in these calculations in order to increase sizing.

The method then includes a step 231 of determining the operational servers to be used as well as the resources required. In a step 232, the servers are selected depending on which required resources are more easily accessible (for example used during the previous periods) and how complex it is to change them.

The selected servers and resources are then compared to the required resource levels and the execution rules in a step 241. This step can advantageously allow a plurality of placement plans to be generated. Subsequently to these comparisons, a placement plan and an evolution plan are selected in a step 242 in order to comply with the execution rules, on the one hand, and to homogenize resource consumption on the different servers, on the other hand. The plans are then executed in a step 245.

Advantageously, once production is started, the method includes a step 251 of monitoring the IT infrastructure in order to determine if the service levels are being met, the execution rules have been complied with and/or the resource consumption has been at the expected level of consumption. If this is the case (OK), then the plans are recorded in a plan catalog in a step 214 and otherwise the plan is invalidated in a step 252.

Thus, the device 100, independent or installed within an IT infrastructure 1, and the method according to the invention allow to optimize the resource utilization of an IT infrastructure 1. In particular, they allow, in a fast and automatic way, to generate an evolution plan listing the changes in resources to be made to place the IT infrastructure in optimal conditions for a given period of activity. They are able to quickly determine which resources could be decreased or increased on the IT infrastructure and the deployment of the application components in order to maintain a quality of service at a desired level.

What is claimed is:

1. A device for optimizing utilization of resources on an IT infrastructure, the IT infrastructure including one or more IT structures hosting a plurality of application components, said device comprising:
a storage module adapted to store a plurality of repositories including:
a capacity management repository configured to store a first data comprising at least two time periods associated with different resource needs,
an application profile repository configured to store a second data identifying the one or more IT structures used by an application component of said plurality of application components and a first item corresponding to a criticality indicator of said application component,
wherein said criticality indicator is a numeric or alphanumeric value that corresponds to an importance of the application component, and
wherein said criticality indicator comprises a score, a ranking, a grade or a category,
an IT infrastructure repository configured to store a third data comprising server resource characteristics for at least one IT structure of the IT infrastructure, said server resource characteristics comprising an evolution rule data item as well as a second data item corresponding to an evolution complexity indicator,
wherein said evolution complexity indicator represents a complexity of evolving the resources of the at least one IT structure,
wherein said complexity of evolving comprises one or more of decreasing and increasing the resources of the at least one IT structure,
an available resource repository configured to store a fourth data comprising available resource characteristics, said available resource characteristics including available amount data as well as a third data item corresponding to a resource provision complexity indicator,
wherein said resource provision complexity indicator represents a complexity of making said resources available to the at least one IT structure in a context of a possible evolution, and
an execution rule repository configured to store a fifth data corresponding to maximum levels of resource utilization;
a load planning module capable of calculating for a particular time period, from the first data of the capacity management repository and the application profile repository, required resource levels;
an IT structure selection module configured to select, from the required resource levels that is calculated and the third data from the IT infrastructure repository and the available resource repository, IT structures from said one or more IT structures required for the particular time period; and
an optimization module configured to generate, from the IT structures that are selected and required for the particular time period and the fifth data from the execution rule repository, at least one placement plan including IT structures data from said one or more IT structures to be used and at least one evolution plan listing resource changes to be made.

2. The device according to claim 1, further comprising a plan catalog configured to store one or more of a plurality of placement plans and evolution plans.

3. The device according to claim 1, wherein the at least two time periods stored by the capacity management repository is characterized by differences in operating characteristics of the plurality of application components comprising one or more of: a volume of data to be processed and the resources consumed by the plurality of application components.

4. The device according to claim 1, wherein the capacity management repository further includes a third data item corresponding to a reliability coefficient of needs of a particular resource.

5. The device according to claim 4, wherein said third data item corresponding to said reliability coefficient of the needs of the particular resource is representative of a reliability of predictions as a function of behavior in one or more of previous time periods and human forecasts for future time periods.

6. The device according to claim 1, wherein the evolution rule data item is selected from one or more of a minimum of a particular resource, a maximum of the particular resource, an evolution step of the particular resource.

7. The device according to claim 1, wherein the IT infrastructure repository is able to update the server resource characteristics after a modification of at least one resource of the one or more IT structures.

8. The device according to claim 1, wherein the available resource repository further includes a fourth data item corresponding to a compatibility indicator.

9. The device according to claim 1, wherein the IT structure selection module is configured to further generate a list of resources required for the particular time period particularly from a sixth data corresponding to levels of said resource utilization on the IT structures, over a current period.

10. The device according to claim 1, wherein the IT structure selection module is configured to select firstly the IT structures used over a current period.

11. The device according to claim 1, wherein the optimization module is configured to generate said at least one placement plan comprising homogenized resource consumption between different infrastructure servers.

12. The device according to claim 1, wherein the optimization module is further configured to generate a plurality of placement plans and a plurality of evolution plans and to select a placement plan from said plurality of placement plans and an evolution plan from said plurality of evolution plans.

13. The device according to claim 1, wherein the optimization module is configured to generate said at least one placement plan such that the IT structures comprise homogenized resource consumptions between different ones of said IT structures.

14. A method for optimizing utilization of resources of an IT infrastructure, said method being implemented by a device for optimizing said utilization of said resources on said IT infrastructure, the IT infrastructure including one or more IT structures hosting a plurality of application components, said device comprising
- a storage module adapted to store a plurality of repositories including
  - a capacity management repository configured to store a first data comprising at least two time periods associated with different resource needs,
  - an application profile repository configured to store a second data identifying the one or more IT structures used by an application component of said plurality of application components and a first item corresponding to a criticality indicator of said application component,
    - wherein said criticality indicator is a numeric or alphanumeric value that corresponds to an importance of the application component, and
    - wherein said criticality indicator comprises a score, a ranking, a grade or a category,
  - an IT infrastructure repository configured to store a third data comprising server resource characteristics for at least one IT structure of the IT infrastructure, said server resource characteristics comprising an evolution rule data item as well as a second data item corresponding to an evolution complexity indicator,
    - wherein said evolution complexity indicator represents a complexity of evolving the resources of the at least one IT structure,
    - wherein said complexity of evolving comprises one or more of decreasing and increasing the resources of the at least one IT structure,
  - an available resource repository configured to store a fourth data comprising available resource characteristics, said available resource characteristics including available amount data as well as a third data item corresponding to a resource provision complexity indicator,
    - wherein said resource provision complexity indicator represents a complexity of making said resources available to the at least one IT structure in a context of a possible evolution, and
  - an execution rule repository configured to store a fifth data corresponding to maximum levels of resource utilization;
- a load planning module capable of calculating for a particular time period, from the first data of the capacity management repository and the application profile repository, required resource levels;
- an IT structure selection module configured to select, from the required resource levels that is calculated and the third data from the IT infrastructure repository and the available resource repository, IT structures from said one or more IT structures required for the particular time period; and
- an optimization module configured to generate, from the IT structures that are selected and required for the particular time period and the fifth data from the execution rule repository, at least one placement plan including IT structures data from said one or more IT structures to be used and at least one evolution plan listing resource changes to be made, and said method comprising:
calculating by the load planning module, the required resource levels for the particular time period, from the first data of the capacity management repository and the second data of the application profile repository;
selecting, by the IT structure selection module, the IT structures required for the particular time period, from the required resource levels that are calculated and the third data from the IT infrastructure repository and the fourth data from the available resource repository; and
generating, by the optimization module, said at least one placement plan including said IT structures data to be used and said at least one evolution plan listing resource changes to be made, from the IT structures that are selected and the fifth data from the execution rule repository.

15. The method according to claim 14, further comprising monitoring the IT infrastructure in order to determine whether execution rules are complied with.

* * * * *